(12) United States Patent
Choi et al.

(10) Patent No.: US 7,968,674 B2
(45) Date of Patent: Jun. 28, 2011

(54) METHOD FOR REMOVING A CARBONIZATION CATALYST FROM A GRAPHENE SHEET AND METHOD FOR TRANSFERRING THE GRAPHENE SHEET

(75) Inventors: Jaeyoung Choi, Suwon-si (KR); Keun Soo Kim, Seoul (KR); Byung Hee Hong, Seoul (KR)

(73) Assignee: Samsung Electronics Co., Ltd. (KR)

( * ) Notice: Subject to any disclaimer, the term of this patent is extended or adjusted under 35 U.S.C. 154(b) by 113 days.

(21) Appl. No.: 12/434,883

(22) Filed: May 4, 2009

(65) Prior Publication Data

US 2010/0101710 A1 Apr. 29, 2010

(30) Foreign Application Priority Data

Oct. 27, 2008 (KR) .................. 10-2008-0105556

(51) Int. Cl.
*C08F 6/22* (2006.01)
*C08F 6/00* (2006.01)

(52) U.S. Cl. ........ 528/485; 156/230; 252/502; 252/506; 428/411.1; 428/412; 502/150; 502/208

(58) Field of Classification Search .................. 156/230; 252/502, 506; 428/411.1, 412; 502/150, 502/208; 528/485
See application file for complete search history.

(56) References Cited

U.S. PATENT DOCUMENTS

| | | | |
|---|---|---|---|
| 5,376,450 A | 12/1994 | Greinke et al. | |
| 7,339,184 B2 | 3/2008 | Romano et al. | |
| 2002/0127169 A1 | 9/2002 | Smalley et al. | |
| 2002/0168526 A1 | 11/2002 | Mercuri et al. | |
| 2003/0232002 A1 | 12/2003 | Burgin | |
| 2005/0205847 A1 | 9/2005 | Dailly et al. | |
| 2006/0216222 A1 | 9/2006 | Jang | |
| 2007/0003473 A1 | 1/2007 | Ikeda et al. | |
| 2007/0284557 A1 | 12/2007 | Gruner et al. | |
| 2009/0308520 A1* | 12/2009 | Shin et al. ........................ 156/60 | |

FOREIGN PATENT DOCUMENTS

| | | |
|---|---|---|
| CN | 1884091 | 12/2006 |
| JP | 1988-227354 | 9/1989 |
| KR | 10-2005-0006635 | 1/2005 |
| KR | 10-2006-0009734 | 2/2006 |
| KR | 10-2007-0094292 | 9/2007 |

OTHER PUBLICATIONS

The extended European Search Report for 09167413.5-1218 dated Nov. 18, 2009.
Sidorov, et al., Electrostatic deposition of graphene, IOP Publishing, Nanotechnology 18 (2007) 135301 (4 pages).
Reina, et al., Transferring and Identification of Single- and Few-Layer Graphene on Arbitrary Substrates, The Journal of Physical Chemistry Letters, 2008, 112, pp. 17741-17744.

* cited by examiner

*Primary Examiner* — Terressa M Boykin
(74) *Attorney, Agent, or Firm* — Cantor Colburn LLP

(57) ABSTRACT

A method for removing a carbonization catalyst from a graphene sheet, the method includes contacting the carbonization catalyst with a salt solution, which is capable of oxidizing the carbonization catalyst.

18 Claims, No Drawings

METHOD FOR REMOVING A CARBONIZATION CATALYST FROM A GRAPHENE SHEET AND METHOD FOR TRANSFERRING THE GRAPHENE SHEET

CROSS-REFERENCE TO RELATED APPLICATION

This application claims priority to Korean Patent Application No. 10-2008-0105556, filed on Oct. 27, 2008, and all the benefits accruing therefrom under U.S.C. §119, the contents of which in its entirety are herein incorporated by reference.

BACKGROUND

1. Field

This disclosure relates to a method for removing a carbonization catalyst from a graphene sheet and a method for transferring the graphene sheet to a substrate or a device.

2. Description of the Related Art

Graphite may comprise a stacked structure of two-dimensional planar sheets in which carbon atoms are bonded in an extended fused array comprising hexagonal rings. A single sheet of the extended fused array, which comprises six-membered carbon rings, may be referred to as graphene.

A graphene sheet, as defined herein, may comprise one or more sheets of graphene. A graphene sheet may have advantageous properties different from those of other materials. In particular, electrons may move on the graphene sheet as if they have zero mass, thus electrons on the graphene sheet may move at the velocity of light in a vacuum. Electron mobility on a graphene sheet has been observed to be from about 20,000 square centimeters per volt seconds ($cm^2/Vs$) to about 50,000 $cm^2/Vs$. Further, a graphene sheet may exhibit unusual half-integer quantum hall effects for electrons and holes.

Since the electrical properties of a graphene sheet, with a given thickness, may change depending on its crystallographic orientation, the electrical properties of the graphene sheet may be controlled by selecting the crystallographic orientation of the graphene sheet. Thus using a graphene sheet devices can be designed to have different electrical properties. The electrical properties of a graphene sheet may be compared with those of a carbon nanotube ("CNT"), which is known to exhibit metallic or semiconducting properties depending on the chirality and diameter of the CNT. A complicated separation process may be desirable in order to take advantage of such metallic or semiconducting properties of CNTs. A graphene sheet may thus have economic advantages over CNTs because a purification process may be avoided, as with synthesized CNTs, thus graphene sheets may be less expensive than CNTs. Therefore, a graphene sheet may be desirable for use in carbon-based electrical or electronic devices.

A graphene sheet may be prepared by a micromechanical process or by a SiC crystal pyrolysis process.

A micromechanical process may include, for example, attaching a tape onto a surface of a graphite sample and releasing the tape from the surface by peeling to remove from the graphite a graphene sheet adhered to the tape. The tape may be then released from the graphene sheet by, for example, dissolving the tape in a solvent.

The SiC crystal pyrolysis process may include, for example, heating a SiC single crystal to decompose SiC on the surface of the crystal. The Si may be removed after the decomposition, and the remaining carbon (C) may form the graphene sheet.

SUMMARY

Large-sized graphene sheets may be reproduced economically using techniques forming graphene sheet on the carbonization catalyst.

The disclosed techniques reduce or effectively prevent damage to a graphene sheet when exfoliating the graphene sheet from the carbonization catalyst after the graphene sheet is formed on the carbonization catalyst.

The above described and other drawbacks are alleviated by a method for removing a carbonization catalyst from a graphene sheet, the method includes contacting the carbonization catalyst with a salt solution, which is capable of oxidizing the carbonization catalyst.

Also disclosed is a method for transferring a graphene sheet, the method includes removing a carbonization catalyst from a graphene sheet by contacting the carbonization catalyst with a salt solution, which is capable of oxidizing the carbonization catalyst; and transferring the graphene sheet with the carbonization catalyst removed to a position on substrate or device.

A salt solution, which is an oxidizing agent capable of oxidizing the carbonization catalyst, may be used to exfoliate the carbonization catalyst from the graphene sheet, wherein possible damage to the graphene sheet may be effectively prevented or reduced. These and other features, aspects, and advantages of the disclosed embodiments will become better understood with reference to the following description and appended claims.

DETAILED DESCRIPTION

Exemplary embodiments are described more fully hereinafter. The invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the description, details of features and techniques may be omitted to more clearly disclose exemplary embodiments.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, the term "and/or" includes any and all combinations of one or more of the associated listed items. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Spatially relative terms, such as "below", "lower", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly. The terminology used herein is for the purpose of describing particular embodiments only and is not intended to be limiting of the invention. As used herein, the singular forms "a," "an" and "the" are intended to include the plural forms as well, unless the context clearly indicates otherwise. Furthermore, the use of the terms a, an, etc. do not denote a limitation of quantity, but rather denote the presence of at least one of the referenced item. The terms "first," "second," and the like do not imply any particular order, but are included to identify individual elements. Moreover, the use of the terms first, second, etc. do not denote any order or importance, but rather the terms first, second, etc. are used to distinguished one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein. Hereinafter, the present invention will be described in detail with reference to the accompanying drawings. However, the aspects, features and advantages of the present invention are not restricted to the ones set forth herein. The above and other aspects, features and advantages of the present invention will become more apparent to one of ordinary skill in the art to which the present invention pertains by referencing a detailed description of the present invention given below.

In an embodiment, an exemplary carbonization catalyst may include at least one element selected from the group consisting of Ni, Co, Fe, Pt, Au, Al, Cr, Cu, Mg, Mn, Mo, Rh, Si, Ta, Ti, W, U, V and Zr. In an embodiment, a carbonization catalyst may consist essentially of at least one element selected from the group consisting of Ni, Co, Fe, Pt, Au, Al, Cr, Cu, Mg, Mn, Mo, Rh, Si, Ta, Ti, W, U, V and Zr. In another embodiment, a carbonization catalyst may consist of at least one element selected from the group consisting of Ni, Co, Fe, Pt, Au, Al, Cr, Cu, Mg, Mn, Mo, Rh, Si, Ta, Ti, W, U, V and Zr. A carbonization catalyst film may be either thin or thick. A thin carbonization catalyst film may have a thickness between about 1 nanometer ("nm") and about 1,000 nm. A thick carbonization catalyst film may have a thickness between about 0.01 millimeter ("mm") and about 5 mm.

Graphene may be formed on a surface of the carbonization catalyst by various methods. An exemplary method includes a chemical vapor deposition ("CVD") method, wherein a gaseous carbon source is disposed on a carbonization catalyst and heat-treated to form graphene on the carbonization catalyst. In an embodiment, a carbonization catalyst may be formed as a film and placed in a chamber substantially void of oxygen. Then, heat-treatment may be carried out at a temperature of, for example, between about 300° C. and about 2,000° C. for a time between about 1 second and about 1 hour while supplying a gaseous carbon source such as carbon monoxide, ethane, ethylene, ethanol, acetylene, propane, butane, butadiene, pentane, pentene, cyclopentadiene, hexane, cyclohexane, benzene, toluene, combinations thereof, or the like, at a flow between about 5 standard cubic centimeters per minute ("sccm") and about 1,000 sccm, specifically between about 10 sccm to about 500 sccm, more specifically between about 20 sccm to about 250 sccm, optionally in the presence of an inert gas such as nitrogen, helium, argon, or the like so as to form graphene. The carbon atoms of the carbon source may bond to each other to form a stable fused planar hexagonal shape with an extended pi-electron system, thus forming the graphene sheet. A graphene sheet with a regular lattice structure may be obtained by cooling the produced graphene sheet. In an embodiment the cooling may include a natural cooling and the cooling rate may be between about 10° C. per minute and about 500° C. per minute, specifically between about 20° C. per minute and about 250° C. per minute, more specifically between about 30° C. per minute and about 125° C. per minute. Exemplary methods of growing graphene on the carbonization catalyst are not limited to the CVD method.

In an exemplary embodiment, a carbonization catalyst may be contacted with a carbon source such as a liquid carbon-based material. In a preliminary heat-treatment of the liquid carbon-based material in the presence of the carbonization catalyst, the liquid carbon-based material may be decomposed by the carbonization catalyst to liberate carbon. The carbon may be implanted into the carbonization catalyst, and thus be carburized, and a graphene sheet may be formed on the carbonization catalyst. Exemplary processes for contacting the carbonization catalyst with the liquid carbon-based material include immersing, or the like. An exemplary liquid carbon-based material is an organic solution. The liquid carbon-based material, however, is not limited to the organic solution and may include any liquid carbon-based material, which may include carbon and be decomposed by the carbonization catalyst. Exemplary organic solutions include polar or non-polar organic solutions having a boiling temperature between about 60° C. and 400° C. Exemplary organic solutions include an alcohol-based organic solution, an ether-based organic solution, a ketone-based solution, an ester-based organic solution, an organic acid-based organic solution, or the like, or a combination comprising at least one of the foregoing organic solutions. An organic solution can have a reduction ability, a reactivity and an adsorption with a carbonization metal catalyst. In an embodiment, an alcohol-based organic solution or an ether-based organic solution may be used. In the preliminary heat-treatment, the liquid carbon-based material and the carbonization catalyst may be stirred to be sufficiently mixed with each other. In an embodiment, the heat-treatment may be carried out at a temperature between about 100° C. and about 400° C., specifically between about 150° C. and about 300° C., more specifically between about 200° C. and about 250° C. for a time between about 10 minutes and 48 hours, specifically between about 20 minutes and 24 hours, more specifically between about 40 minutes and 12 hours.

In another exemplary embodiment, a carbonization catalyst may be contacted with a carbon source, such as a carbon-containing polymer, to form a graphene sheet. The carbon-containing polymer is not limited to a specific carbon-containing polymer. In an embodiment, the carbon-containing polymer is a self-assembling polymer. The self-assembling polymer may be perpendicularly aligned on the carbonization polymer to form a self-assembled layer, which can help formation of a high-density graphene sheet. In an embodiment the self-assembling polymer is at least one polymer selected from the group consisting of an amphiphilic liquid crystal polymer and a conductive polymer.

In an exemplary embodiment, the graphene sheet may comprise a graphene sheet. In an embodiment, the graphene sheet may comprise fused polycyclic aromatic rings with covalently bonded carbon atoms having $sp^2$ orbital hybridization). The covalently bonded carbon atoms may form a 6-membered ring as a basic repeating unit, but 5- and/or 7-membered rings may also be formed. The graphene sheet may be a single layer of graphene or may comprise multiple layers of graphene. In an embodiment the graphene sheet may comprise up to about 300 layers of graphene, specifically up to about 200 layers of graphene, more specifically up to about 100 layers of graphene. The graphene sheet may include various structures. The structure may be varied depending on the content of the 5- and/or 7-membered rings included in the graphene sheet. In an embodiment, the edges of the graphene sheet may be saturated with hydrogen atoms.

In an exemplary embodiment, the graphene sheet may have an area having a length greater than or equal to about 1 mm, specifically between about 1 mm and about 1,000 mm, more specifically between about 10 mm and about 100 mm, along at least one of a transverse direction and a longitudinal direction. Further, the graphene sheet may desirably have a homogeneous structure with few defects.

It may be desirable to remove the carbonization catalyst to use the graphene sheet for various applications. For example, when the graphene sheet is used as a substrate or in a device, it may be desirable to transfer the graphene sheet, from which the carbonization catalyst has been removed, to the substrate or the device.

In an exemplary embodiment, a salt solution may be used as an etching solution to remove the carbonization catalyst on which graphene has grown. As used herein, a salt refers to a compound formed from a neutralization reaction of an acid and a base, and a salt solution may refer to a solution in which a salt is dissolved in a solvent. As for the salt of the salt solution, an oxidizing agent capable of oxidizing (loss of electrons) the carbonization catalyst by reacting with the carbonization catalyst may be used. The carbonization catalyst may be etched using the salt solution. When the carbonization catalyst is etched using the salt solution, tearing or other possible damage to a graphene sheet, which may be caused by hydrogen or other gases, may be effectively prevented or reduced because hydrogen or other gases are not evolved, unlike when an acidic solution is used.

The salt solution may be neutral. In an embodiment, the salt solution may be acidic or basic. In an exemplary embodiment, a salt solution, which is not acidic (i.e., a neutral or basic salt solution) may be used. In another embodiment a salt solution, which is not acidic and basic (i.e., a neutral salt solution) may be used.

By avoiding an acidic environment, which may result in damage to a graphene sheet, the graphene sheet may be obtained without damage or having less damage than that caused an acidic environment. Further, by avoiding use of a basic solution, production of a solid reaction product may be reduced or effectively prevented.

The salt solution may comprise a salt, such as $FeCl_3$, $KMnO_4$, $KClO_3$, $KMnO_3$, $K_2CrO_4$, $K_2Cr_2O_7$, or the like, or a combination comprising at least one of the foregoing salts. The salt solution may consist essentially of a salt, such as $FeCl_3$, $KMnO_4$, $KClO_3$, $KMnO_3$, $K_2CrO_4$, $K_2Cr_2O_7$, or the like, or a combination comprising at least one of the foregoing salts. The salt solution may consist of a salt, such as $FeCl_3$, $KMnO_4$, $KClO_3$, $KMnO_3$, $K_2CrO_4$, $K_2Cr_2O_7$, or the like, or a combination comprising at least one of the foregoing salts. The foregoing salt solutions may be neutral salt solutions.

In the salt solution, the solvent may be, for example, water. In an embodiment, the salt solution may be an aqueous salt solution. In an embodiment, the salt solution may comprise an aqueous $FeCl_3$ solution, an aqueous $KMnO_4$ solution, an aqueous $KClO_3$ solution, an aqueous $KMnO_3$ solution, an aqueous $K_2CrO_4$ solution, an aqueous $K_2Cr_2O_7$ solution, or the like, or a combination comprising at least one of the foregoing salt solutions. In another embodiment, the salt solution may consist essentially of an aqueous $FeCl_3$ solution, an aqueous $KMnO_4$ solution, an aqueous $KClO_3$ solution, an aqueous $KMnO_3$ solution, an aqueous $K_2CrO_4$ solution, an aqueous $K_2Cr_2O_7$ solution, or the like, or a combination comprising at least one of the foregoing salt solutions. In another embodiment, the salt solution may consist of an aqueous $FeCl_3$ solution, an aqueous $KMnO_4$ solution, an aqueous $KClO_3$ solution, an aqueous $KMnO_3$ solution, an aqueous $K_2CrO_4$ solution, an aqueous $K_2Cr_2O_7$ solution, or the like, or a combination comprising at least one of the foregoing salt solutions.

In an embodiment the carbonization catalyst is removed using the salt solution. In an embodiment an aqueous $FeCl_3$ solution may be used as the salt solution when nickel is used as the carbonization catalyst. As shown in Reaction Scheme 1 below, a nickel carbonization catalyst may be oxidized (loses electrons) by an oxidizing agent, $FeCl_3$, to form nickel chloride. Through this reaction the carbonization catalyst may be etched and exfoliated from graphene, and thus be removed.

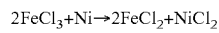

$2FeCl_3 + Ni \rightarrow 2FeCl_2 + NiCl_2$      Reaction Scheme 1

Although various exemplary salt solutions have been disclosed, the salt solution is not limited to these specific examples. Any salt solution capable of oxidizing the carbonization catalyst may be used.

In an exemplary embodiment, the graphene sheet formed on the carbonization catalyst may further comprise a first surface and a second surface, the first surface contacting the carbonization catalyst and the second surface contacting a hydrophobic film. In an exemplary embodiment, the graphene sheet formed on the carbonization catalyst may further consist essentially of a first surface and a second surface, the first surface contacting the carbonization catalyst and the second surface contacting a hydrophobic film. In an exemplary embodiment, the graphene sheet formed on the carbonization catalyst may further consist of a first surface and a second surface, the first surface contacting the carbonization catalyst and the second surface contacting a hydrophobic film. The hydrophobic film may support or fix the graphene sheet from which the carbonization catalyst has been removed. By contacting the hydrophobic film with the graphene sheet, which can be hydrophobic, self-rolling or partial damage of the graphene sheet, from which the carbonization catalyst has been removed, may be effectively prevented or reduced upon exposure to a solvent. For reference, the graphene sheet from which the carbonization catalyst has been removed may self-roll or may be partially damaged due to a difference of polarity from the solvent in order to form a stable structure.

In an embodiment, the graphene sheet formed on the carbonization catalyst may be contacted with the hydrophobic film prior to contacting with the salt solution, and then the carbonization catalyst may be contacted with the salt solution to remove the carbonization catalyst.

The thickness of the hydrophobic film is not limited.

The hydrophobic film may be a film, which can exhibit hydrophobic surface properties. In an embodiment, the hydrophobic film may comprise a siloxane-based compound, an acryl-based compound, an epoxy-based compound, a conductive polymer, a polymer electrolyte, a photoresist, a metal paste, or the like, or a combination comprising at least one of the foregoing materials. In another embodiment, the hydrophobic film may consist essentially of a siloxane-based compound, an acryl-based compound, an epoxy-based compound, a conductive polymer, a polymer electrolyte, a photoresist, a metal paste, or the like, or a combination comprising at least one of the foregoing materials. In another embodiment, the hydrophobic film may consist of a siloxane-based compound, an acryl-based compound, an epoxy-based compound, a conductive polymer, a polymer electrolyte, a photoresist, a metal paste, or the like, or a combination comprising at least one of the foregoing materials.

Exemplary siloxane-based compounds include, for example, polydimethylsiloxanes ("PDMS"), polydiphenylsiloxanes ("PDPS"), polysilsesquioxanes ("PSQ"), copolymers thereof, combinations thereof or the like.

Exemplary acryl-based compounds include poly(methyl methacrylate) ("PMMA"), poly(ethyl methacrylate) ("PEMA"), poly(butyl methacrylate) ("PBMA"), poly(isobutyl methacrylate) ("PIBMA"), copolymers thereof, combinations thereof or the like.

Exemplary epoxy-based compounds include epoxy resin, or the like. Epoxy resin may be produced from condensation polymerization of bisphenol A and epichlorohydrin, and various epoxy resins may be obtained depending on the proportion of the two monomers and/or the molecular weight of the polymer produced.

Exemplary conductive polymers include polyacetylene, polypyrrole, polyaniline, polythiophene, copolymers thereof, combinations thereof or the like.

Exemplary polymer electrolyte materials include polyphosphagen or the like.

Exemplary photoresist materials include various photosensitive polymers such as cinnamic acid polyvinyl ester or the like. In an embodiment, a commercial photoresist material may be used, such as for example, AZ 111, available from MicroChem Corp.

Exemplary metal pastes include Ag paste, or the like.

The carbonization catalyst may be exfoliated by the salt solution (e.g., $FeCl_3$ solution), and the hydrophobic film contacting the graphene sheet may also be contacted by the salt solution, which acts as etchant. Thus, while not wanting to be bound by theory, the hydrophobic film may function better if it is less damaged by the salt solution. When the salt solution is neither acidic nor basic, damage to the hydrophobic film may be effectively prevented or reduced.

In an exemplary embodiment, a graphene sheet from which the carbonization catalyst has been removed by the aforesaid treatment with the salt solution, or a graphene sheet, which may be in contact with the hydrophobic film, may be transferred to a position on a substrate or a device. A substrate may be a plate-shaped material on to which the graphene sheet may be transferred.

The transferring process may be carried out, for example, by contacting a hydrophobic graphene sheet or the graphene sheet, which may be in contact with the hydrophobic film in the salt solution, with a substrate or a device. Alternatively, the graphene sheet, which may be in contact with the hydrophobic film after removing the salt solution, may be transferred to a substrate or a device. The hydrophobic film may be removed or not removed after the transferring, if desired.

The substrate may be a silicon substrate, $SiO_2$-coated silicon substrate, polyethylene terephthalate ("PET") substrate or the like.

Further, the substrate may be a hydrophobic substrate and comprise a hydrophobic material such as a siloxane-based compound, an acryl-based compound, an epoxy-based compound, a conductive polymer, a polymer electrolyte, a photoresist, a metal paste, or the like, or a combination thereof. In an embodiment, the substrate may be a hydrophobic substrate and consist essentially of a hydrophobic material such as a siloxane-based compound, an acryl-based compound, an epoxy-based compound, a conductive polymer, a polymer electrolyte, a photoresist, a metal paste, or the like, or a combination thereof. In another embodiment, the substrate may be a hydrophobic substrate and consist of a hydrophobic material such as a siloxane-based compound, an acryl-based compound, an epoxy-based compound, a conductive polymer, a polymer electrolyte, a photoresist, a metal paste, or the like, or a combination thereof.

When a hydrophobic substrate is used, the graphene sheet may first be transferred to the hydrophobic substrate, and then the graphene sheet transferred to the hydrophobic substrate may be transferred again to a position on another substrate or a device. The hydrophobic substrate may be removed or not removed after the transferring if desired.

Further, the graphene sheet, which may be in contact with the hydrophobic film, may be directly transferred to a position on a device. In an exemplary embodiment, wherein the device is a field-effect transistor ("FET"), the graphene sheet, which may be in contact with the hydrophobic film, may be transferred to a region of the FET between a drain electrode and a source electrode. As described above, the hydrophobic film may be removed or not removed after the transferring as desired.

In an exemplary embodiment, the graphene sheet may be cut into a specific shape or may be formed to have a tube shape by rolling the graphene sheet in a selected direction. A tube-shaped graphene sheet may contact or be coupled to a selected object.

The thus obtained graphene sheet, with damage prevented or reduced, is useful in various applications including transparent electrodes, conducting thin films, hydrogen storage media, optical fibers, electronic devices, or the like. Further, the disclosed graphene sheet may have an area, which is larger than an area of a graphene sheet obtained by other physical methods.

The following examples are for illustrative purposes only and not intended to limit the scope of the claimed invention. For reference, the expression A/B in the following examples denotes that B is formed on A.

EXAMPLE 1

On a silicon substrate having dimensions of about 5 centimeters ("cm") by about 5 cm, $SiO_2$ and Ni are sequentially coated to a thickness of about 300 nm, respectively. The silicon substrate is loaded in a quartz tube furnace. First, in order to remove an oxide layer from the Ni surface, $H_2$ and Ar are supplied at a rate of about 100 sccm and about 200 sccm, respectively, at 1,100° C. for 1 hour. Then, $CH_4$, $H_2$ and Ar are supplied at a rate of about 50 sccm, about 65 sccm and about 200 sccm, respectively, for about 20 minutes, while maintaining the same temperature. Subsequently, the substrate is cooled at a rate of about 10° C. per second while supplying Ar at a rate of about 200 sccm. Through this CVD process, a graphene sheet is formed on the Ni catalyst. The thus obtained sample is expressed as a Si/SiO$_2$/Ni/graphene sheet.

The Si/SiO$_2$/Ni/graphene sheet is immersed in a 1 molar ("M") FeCl$_3$ aqueous solution to etch the Ni.

The graphene sheet is released from the sample as the Ni is etched. The graphene sheet floats on the aqueous FeCl$_3$ solution because it is hydrophobic.

Using a PDMS substrate, which has hydrophobic surface properties, the graphene sheet floating on the aqueous FeCl$_3$ solution is transferred from the surface of the aqueous FeCl$_3$ solution to the surface of the PDMS substrate. Subsequently, the graphene sheet transferred on the surface of the PDMS substrate is transferred again to a silicon substrate on which SiO$_2$ is coated to have a thickness of about 300 nm, and then the PDMS substrate is removed.

EXAMPLE 2

A Si/SiO$_2$/Ni/graphene sheet is obtained in the same manner as Example 1. In this example, a PDMS substrate, which has hydrophobic surface properties, is contacted at a graphene side surface. Thus obtained sample is expressed as Si/SiO$_2$/Ni/graphene sheet/PDMS film.

The Si/SiO$_2$/Ni/graphene sheet/PDMS film is immersed in a 1 M FeCl$_3$ aqueous solution to etch the Ni. A graphene sheet/PDMS film is released into the aqueous FeCl$_3$ solution as the Ni is etched. The PDMS film may serve to support or fix the graphene sheet. The graphene sheet/PDMS film sample is collected and stamped on a silicon substrate, so that the graphene sheet on the surface of the PDMS film is transferred to the silicon substrate, on which the SiO$_2$ is coated, to have a thickness of about 300 nm. Then, the PDMS film is removed.

EXAMPLE 3

An Si/SiO$_2$/Ni/graphene sheet/PDMS film is obtained in the same manner as Example 2. The Si/SiO$_2$/Ni/graphene sheet/PDMS film is immersed in a 1 M FeCl$_3$ aqueous solution to etch the Ni. A graphene sheet/PDMS film is released from the sample into the aqueous FeCl$_3$ solution as the Ni is etched. The graphene sheet side of the graphene sheet/PDMS film is transferred onto a surface of a PDMS substrate. Subsequently, the graphene sheet/PDMS film transferred on the surface of the PDMS substrate is transferred again to a silicon substrate on which the SiO$_2$ is coated to have a thickness of about 300 nm, and the PDMS substrate and the PDMS film are removed.

While the invention has been shown and described with reference to certain exemplary embodiments thereof, it will be understood by those skilled in the art that various changes in form and details may be made thereto without departing from the spirit and scope of the invention as defined by the appended claims.

In addition, modifications can be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A method for removing a carbonization catalyst from a graphene sheet, the method comprising:
    contacting the carbonization catalyst with a non-acidic salt solution, which is capable of oxidizing the carbonization catalyst through loss of electrons.

2. The method according to claim 1, wherein the salt solution is a neutral salt solution.

3. The method according to claim 1, wherein the salt solution comprises at least one salt selected from the group consisting of FeCl$_3$, KMnO$_4$, KClO$_3$, KMnO$_3$, K$_2$CrO$_4$ and K$_2$Cr$_2$O$_7$.

4. The method according to claim 1, wherein the graphene sheet further comprises a first surface and a second surface, the first surface contacting the carbonization catalyst and the second surface contacting a hydrophobic film.

5. The method according to claim 4, wherein the hydrophobic film comprises at least one compound selected from the group consisting of a siloxane-based compound, an acryl-based compound, an epoxy-based compound, a conductive polymer, a polymer electrolyte material, a photoresist material, and a metal paste.

6. The method according to claim 1, wherein the carbonization catalyst comprises at least one element selected from the group consisting of Ni, Co, Fe, Pt, Au, Al, Cr, Cu, Mg, Mn, Mo, Rh, Si, Ta, Ti, W, U, V and Zr.

7. A method for transferring a graphene sheet, the method comprising:
    removing a carbonization catalyst from a graphene sheet by contacting the carbonization catalyst with a neutral salt solution or a basic salt solution, which is capable of oxidizing the carbonization catalyst through loss of electrons; and
    transferring the graphene sheet with the carbonization catalyst removed to a position on a substrate or a device.

8. The method according to claim 7, wherein the salt solution is a neutral salt solution.

9. The method according to claim 7, wherein the salt solution comprises at least one salt selected from the group consisting of FeCl$_3$, KMnO$_4$, KClO$_3$, KMnO$_3$, K$_2$CrO$_4$ and K$_2$Cr$_2$O$_7$.

10. The method according to claim 7, further comprising transferring the graphene sheet with the carbonization catalyst removed to a hydrophobic substrate; and
    transferring the graphene sheet on the hydrophobic substrate to a position on another substrate or a device.

11. The method according to claim 10, wherein the hydrophobic substrate comprises at least one compound selected from the group consisting of a siloxane-based compound, an acryl-based compound, an epoxy-based compound, a conductive polymer, a polymer electrolyte material, a photoresist material and a metal paste.

12. The method according to claim 7, wherein the graphene sheet is formed on the carbonization catalyst, the graphene sheet comprising a first surface and a second surface, the first surface contacting the carbonization catalyst and the second surface contacting a hydrophobic film.

13. The method according to claim 12, wherein the hydrophobic film comprises at least one compound selected from the group consisting of a siloxane-based compound, an acryl-based compound, an epoxy-based compound, a conductive polymer, a polymer electrolyte material, a photoresist material, and a metal paste.

14. The method according to claim 7, wherein the carbonization catalyst is at least one element selected from the group consisting of Ni, Co, Fe, Pt, Au, Al, Cr, Cu, Mg, Mn, Mo, Rh, Si, Ta, Ti, W, U, V and Zr.

15. The method according to claim 1, wherein the contacting further comprises exfoliating the carbonization catalyst.

16. The method according to claim 1, wherein the carbonization catalyst is an oxidizing agent.

17. The method according to claim 7, wherein the removing further comprises exfoliating the carbonization catalyst.

18. The method according to claim 7, wherein the salt solution is an oxidizing agent.

* * * * *